United States Patent [19]

Goldman

[11] Patent Number: 4,544,953
[45] Date of Patent: Oct. 1, 1985

[54] AUTOMATIC FACUSING USING SLOPE AND PEAK DETECTION

[75] Inventor: David A. Goldman, Yorktown Heights, N.Y.

[73] Assignee: Designs for Vision, Inc., New York, N.Y.

[21] Appl. No.: 479,457

[22] Filed: Mar. 28, 1983

[51] Int. Cl.⁴ .............................................. H04N 5/26
[52] U.S. Cl. ................................................... 358/227
[58] Field of Search ................ 358/227; 354/402, 406, 354/407, 408; 369/46; 250/201, 204; 352/140; 382/6

[56] References Cited

U.S. PATENT DOCUMENTS

| | | | |
|---|---|---|---|
| 3,643,574 | 2/1972 | Moriyami | 354/165 |
| 3,699,248 | 10/1972 | McKechnie | 358/210 |
| 3,728,482 | 4/1973 | Wren | 358/227 |
| 3,967,056 | 6/1976 | Yata et al. | 358/227 |
| 4,317,135 | 2/1982 | Pitruzzello | 358/227 |
| 4,392,726 | 7/1983 | Kimura | 358/227 |

Primary Examiner—John C. Martin
Assistant Examiner—Howard L. Carter
Attorney, Agent, or Firm—Arthur L. Plevy

[57] ABSTRACT

There is disclosed a VIDEO AUTOMATIC FOCUSSING SYSTEM in which a video signal from the television camera is directed to a band pass filter and then detected to produce a DC signal indicative of the video signal as band limited. The detected signal is directed to the inputs of a negative slope detector and peak detector. The detectors monitor the slope of the video signal to form the basis for controlling the motor to achieve automatic focussing on command.

16 Claims, 4 Drawing Figures

AUTOMATIC FACUSING USING SLOPE AND PEAK DETECTION

BACKGROUND OF INVENTION

This invention relates to an automatic focusing system and in particular to an automatic focusing system for utilization in a combined television and surgical microscope apparatus.

Essentially, the prior art is replete with a number of patents and disclosures relating to automatic focusing devices which devices are utilized in many applications such as photographic cameras, television cameras, and so on. Many prior art patents and apparatus have attempted to measure the quality of focus by measuring the amount of high spatial frequency content in a viewed scene. In such systems there is a problem in obtaining focusing due to the fact that with a moderate or high content the system requires a large dynamic range in order to achieve accurate focusing. The various examples of such systems have been employed in the prior art.

Basically, there are many techniques employed for implementing and achieving focusing in the optical field. For example, U.S. Pat. No. 3,643,574 entitled Focusing Device for Optical Equipment issued on Feb. 2, 1972 to H. Moriyami. This patent shows a focusing system for a movie or television camera. The patent describes a mechanical system using a switching reflector which is mounted so that it can be moved in or out of the optical path of the camera. The reflector is moved into the optical path of a view finder when the camera is being focussed and is moved out of the path after focusing has occurred.

U.S. Pat. No. 3,699,248 entitled Automatic Area of Interest Television Optical Probe Focus Apparatus issued Oct. 17, 1972 to John C. McKechnie. This patent depicts a system where focusing is achieved in regard to a particular scene that a viewer is watching. The apparatus provides focusing by using the video signal of a television camera which signal is used to adjust a lens system which lens system is connected to motors for movement of the same. The control signal for the motors is developed by a frequency discriminator whose output is a function of the frequency of the video signal. The apparatus uses a delay circuit which operates in conjunction with two successive samples of the signal to drive the motors until proper focusing occurs.

U.S. Pat. No. 3,728,482 entitled Focusing issued on Apr. 17, 1973 to J. F. Wren. This patent describes a focusing system for a television camera. The video signal from the camera is band limited so that the high frequency content of the signal is retrieved. This signal is rectified and integrated in first path. The video signal is also directed to a threshold detector which operates with a counter to provide a pulse indicative of a scan line. The apparatus attempts to normalize the high frequency signal to obtain a control signal used for automatic focusing.

U.S. Pat. No. 3,967,056 entitled Automatic Focusing Apparatus issued on Jun. 29, 1976 to K. Yata, et al. This patent describes a focusing system employing a video signal which signal is applied to a maximum and a minimum value detector. The detectors produce signals indicative of a minimum and a maximum signal during a scan. The difference or ratio between the signal values is determined. This is indicative of a focus setting when the difference signal reaches an extreme value manifested by the interuption of movement of the lens assembly.

U.S. Pat. No. 4,317,135 entitled Focus Detection Circuitry issued Feb. 23, 1982 to M. C. Pitruzzello. This patent describes a focus meter which employs a video signal emanating from a television camera. The signal is differentiated and peak detected. A portion of the signal is coupled from the amplifier to a sync separator circuit which causes a gate signal to be generated to disable the differentiator for blanking pulse. The circuit operates to provide a peak signal which is applied to a volt meter. The output of the volt meter is indicative of a proper focus. Thus, as can be seen, the above techniques and others describe various methods for providing automatic focusing which employs a video signal and which use a particular frequency portion of the signal, such as the high frequency portion, to develop a control signal for focusing a lens assembly. In any event, there are difficulties in regard to these techniques and in many of the prior art techniques in that focusing is not reliably achieved due to the detection of the high frequency components and due to various techniques of controlling the lens assembly.

In the system to be described, automatic focusing is employed to control the focus of a microscope which is associated with a television system. In this system the output of the microscope is displayed on a television screen with the system particularly adapted for use in the operating room environment. In this manner the microscope is employed to enlarge an area upon which an operation is being performed, and the optical system enables the viewed area to be displayed upon the screen of a television receiver.

In regard to such considerations, the image must be properly focussed and frequently refocussed because the object change or movement in order for this participants to accurately view the area during the surgical procedure. It is further apparent that an accurate representation of the area is necessary in order to enable students and others to optimumly visualize the procedures involved. Hence focusing quality is of prime importance in such a system. It is, therefore, an object of the present invention to provide an automatic focusing system particularly useful with an operating room microscope and a televison camera to enable accurate and reliable focussing. An additional object is to achieve automatic focus in a very short time. Using the slope technique as opposed to a point by point plot of the detector output, with the maximum determined after a complete plotting. The maximum in this slope technique is reached quickly by detecting when the maximum is being approached and retreated from.

BRIEF DESCRIPTION OF THE PREFERRED EMBODIMENT

An automatic focusing system responsive to a video signal of the type generated by a television camera to provide a focus adjustment for a focus assembly associated with a focusable apparatus comprising filter means responsive to said video signal for providing at an output a band-limited signal, video detector means responsive to said band-limited signal to provide at an output a detected signal, slope detecting means responsive to said detected signal to provide at an output an indication of the direction of said rate of change of said signal, and logic means coupled to said detector means responsive to said output to provide a control signal indicative of the direction of focus adjustment, and drive means responsive to said control signal to provide a drive signal capable of rapidly adjusting a focus assembly to an optimum focus.

DETAILED DESCRIPTION OF THE FIGURES

Figure 1:
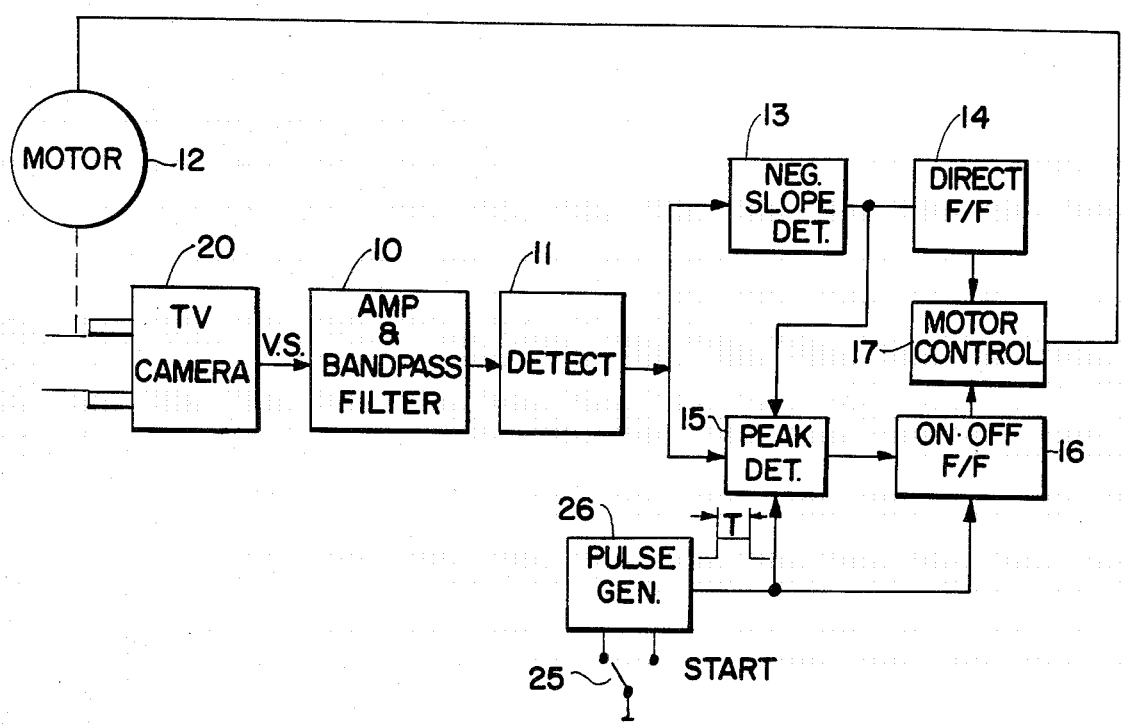
FIG. 1 is a simplified block diagram of the video automatic focusing system.

Referring to FIG. 1, there is shown a simplified block diagram of an automatic focusing control system according to this invention. Essentially, the television camera 20 is depicted with its lens focus control coupled to a gear train which is in turn driven by a motor 12. The video signal emanating from the television camera is applied to the input of an amplifier and band pass filter 10. This video signal as will be explained is processed to derive information used for achieving optimum focus of an image on the vidicon tube. The image in this case is from a microscope field. For simplicity of explanation of the technique, the description of FIG. 1 is representative of a black and white television presentation, but color differentiation can be accommodated by the system as will be explained. The television signal, as indicated, from the video camera is applied to the amplifier and bandpass filter 10 has the low frequency content removed. The output of the band pass filter 10 is applied to an input of an video detector 11.

Essentially, the system determines optimum focus of a planar image which is being scanned by the television camera by monitoring abrupt changes in each line scan and sense these changes within a television frame. As will be explained, since the time requirement for providing automatic focusing is much greater than 1/30 of a second, sensing can be done and accomplished over a few frame intervals. This enables simplified circuitry and greatly reduces 60 and 120 Hz filtering. As will be explained, the output capacitor employed in the detector 11 performs the sensing, and as focus varies, the detector output is a weighted running average of the significant abrupt changes in each television line.

The characteristics of abrupt changes in luminance has been determined empirically. Hence by utilizing a band pass filter from 10 KHz to 4 MHz, almost no change is noticed in the detector output as focus is varied. Using a 200 KHz to 4 MHz band width with an 18 db low frequency fall off, a significant variation in the detection output is discerned. Essentially, these factors determine the band width and slope of the band pass filter 10 characteristics. When a color TV camera is employed, a notch filter is introduced to reduce the 3.58 MHz color signal. From theoretical considerations it appears this same filter to be effective in addition to luminance variation to provide automatic focus information. The 3.58 MHz color signal varies in phase with change in color. This phase modulation produces a spectrum of different frequencies on either side of the 3.58 MHz center frequency. The signal with frequencies above the center are essentially filtered out by the amplifier transistors and the frequencies on the lower side are dominantly above 200 KHz. These lower frequency signals are anticipated to add to the high frequency component of the video luminance signal previously described to provide additional focussing information. The 3.58 MHz filter in the collector of transistor 34 reduces the high frequency contribution of the color burst and greatly attenuates signals close to 3.58 MHz. Abruptly changing colors in the frame causes a wider distribution of signal energy on either side of 3.58 MHz. Thus focussing information provided by color variations is somewhat analogous to the high frequency luminance signal previously described and a color 3.58 MHz filter is utilized to allow certain of the frequency components due to the color variation to add to the luminance signal to thereby effectuate more abrupt changes in the signal so that the focussing circuit can respond more rapidly. Frequency variations due to color change occur even if the luminance value of adjacent colors is the same.

The output of the detector 11 is directed to the input of a negative slope detector 13 and to the input of a peak detector 15. The output of the negative slope detector 13 is coupled to a direction flip flop 14 and is also coupled to a control input of the peak detector 15. The output of the peak detector 15 is applied to the input of an on/off flip flop 16.

The outputs of both direction flip flop 14 and the on/off flip flop 16 are coupled to inputs of a motor control circuit 17. The output of the motor circuit 17 is coupled to the motor 12 to thereby control the motor in accordance with obtaining a proper focussing position. As can be seen from the block diagram, an input of peak detector 15 and an input to the on/off flip flop 16 receives a pulse. The pulse is designated as a start automatic focus pulse and has a pulse width T as will be explained.

Figure 2:
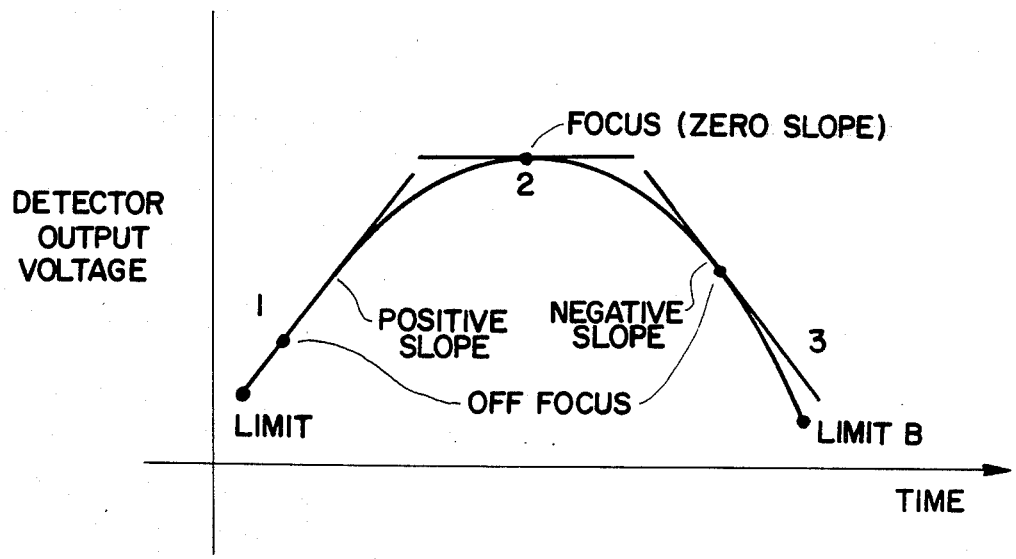
FIG. 2 is a simplified diagram useful in explaining operation of the system.

Referring to FIG. 2, there is shown a diagram depicting the output of the detector versus time. In order to gain clearer understanding of the operation of the invention. As the television camera lens is uniformly rotated from off focus, past focus, to off focus again, the output of the detector exhibits a variation in voltage as shown in FIG. 2 with respect to time. The slope or change in voltage versus time thus goes from positive through 0 to negative and these slope relationships form the basis for controlling the lens assembly of the television camera to achieve focussing upon command.

As shown in FIG. 1, the detector output is applied to both a negative slope detector 13 and the peak detector circuit 15. The operation of the system is as follows. Upon initiating the automatic focussing mode, the user will place the switch 25 in the start position momentarily to thus cause the pulse generator 26 to provide a start pulse which is approximately 0.2 seconds in duration. This pulse inhibits the peak detector 15 and triggers the on/off flip flop 16 into the On mode. The direction flip flop 14 is not set or reset at the start unless the focus mechanism is at a limit stop.

As shown in FIG. 2, there is a limit A and a limit B. These limits are implemented by use of switches such as microswitches which are used to set the direction if the lens mechanism is at either limit for the system to allow the motor 12 to move the lens in the appropriate direction for the optimum focus. Generally speaking, automatic focussing may be initiated at any point on the curve of FIG. 2 from limit 1 to limit 3.

In regard to this discussion assume that the search is started at point 1 on the curve of FIG. 2. Also assume that the direction flip flop 14 is in the correct position. Essentially, if one looks at the dot which corresponds to the instantaneous operating point referenced by numeral 1, it can be thought of as moving up the curve towards the focus point 2.

If the automatic focussing search is started with the direction flip flop 14 in the incorrect state, the dot can be thought of as moving down the curve to the left thus providing a negative slope which is detected by the negative slope detector 13. The detection of the negative slope causes the negative slope detector 13 to change the state of the direction flip flop 14. This signal causes the motor control 17 to reverse the direction of the motor 12. Thus the direction flip flop changes state within the 0.2 second start interval as determined by the start pulse and the process continues. The first negative slope detection after the 0.2 second interval enables the output of peak detector 15. The peak detector 15 as indicated is inhibited for the 0.2 second interval and until a change occurs in the output of the negative slope detector 13 after the 0.2 second interval. The peak storage capacitor is also held down during the 0.2 second interval.

Thereafter, the operating point as depicted by the dot shown in FIG. 2, proceeds up the positive slope of the curve through focus similarly as described when the initial slope is positive. This is so as the slope detector 13 does not respond to a positive slope. Thus the lens assembly is caused to go through focus until a negative slope of sufficient amplitude is detected. This in turn changes the state of the direction flip flop 14 to thereby reverse the direction of the motor 12. At this time, the peak detector 15 is not inhibited and as the focus moves towards the peak of the curve as determined by point 2, the peak detector 15 responds to peak to change the state of the on/off flip flop 16 to thereby cause the motor control circuit 17 to stop motor operation. The motor is stopped just before the actual peak occurs. This is based on circuit operation because when the circuit goes through the peak, the first time its magnitude is stored in the peak detector 15, and when the peak is detected for the second time, the peak detector output goes slightly positive before the peak is reached. This causes the motor to stop but due to inertia, this delay actually compensates for motor coast. If a start command is given to the system when the system is in or close to optimum focus as being at point 2, the dot effectively moves slightly to one side of the peak. This, being arbitrary and dependent on the state of the direction flip flop 14. If a negative rate or negative slope is detected, the negative slope detector 13 again alters the state of the direction flip flop so that the dot proceeds back towards the peak.

In this system the dot may oscillate about the peak before stopping because the peak detector 15 is inhibited for the 0.2 seconds which is the duration of the start pulse. This slight delay is of little significance when the process is initiated from slightly off focus, and focussing may be achieved in the order of a second, very significant in a real time surgical situation. As one can see from the above description, the actual video signal from the television camera is employed directly. The system relies upon slope detection to determine correct focussing. Since the television camera is already required in the system, no additional sensors are necessary for automatic focussing. The motor 12 can also directly control the focussing of the microscope due to the fact that the image as indicative of the video signal is derived through the optical path of the microscope. As is also known, the camera employs automatic gain control which automatically compensates for the wide variation in object illumination.

Figure 3A:
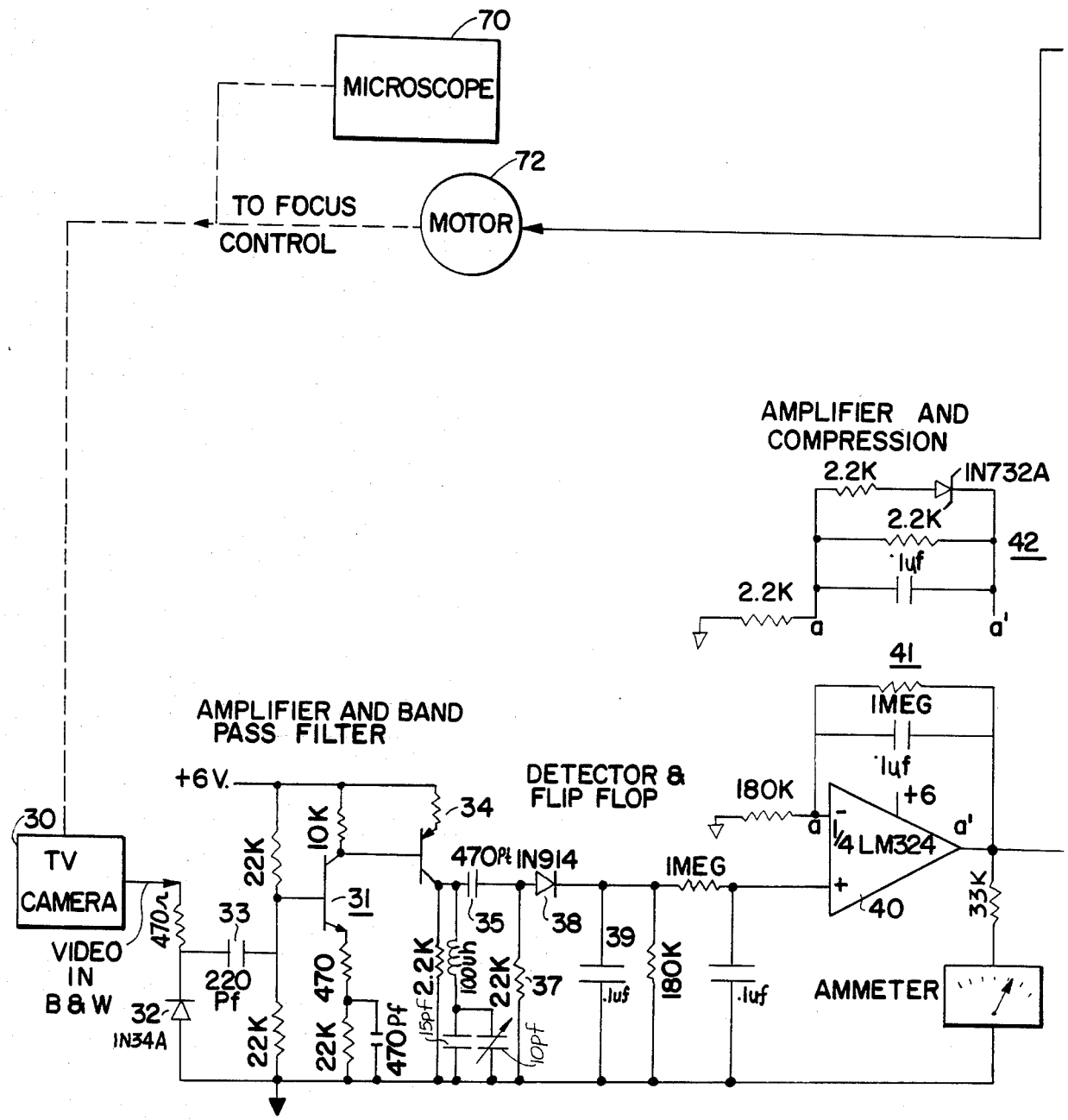
FIGS. 3a and 3b together form a detailed schematic diagram of the system of FIG. 1.
Figure 3B:
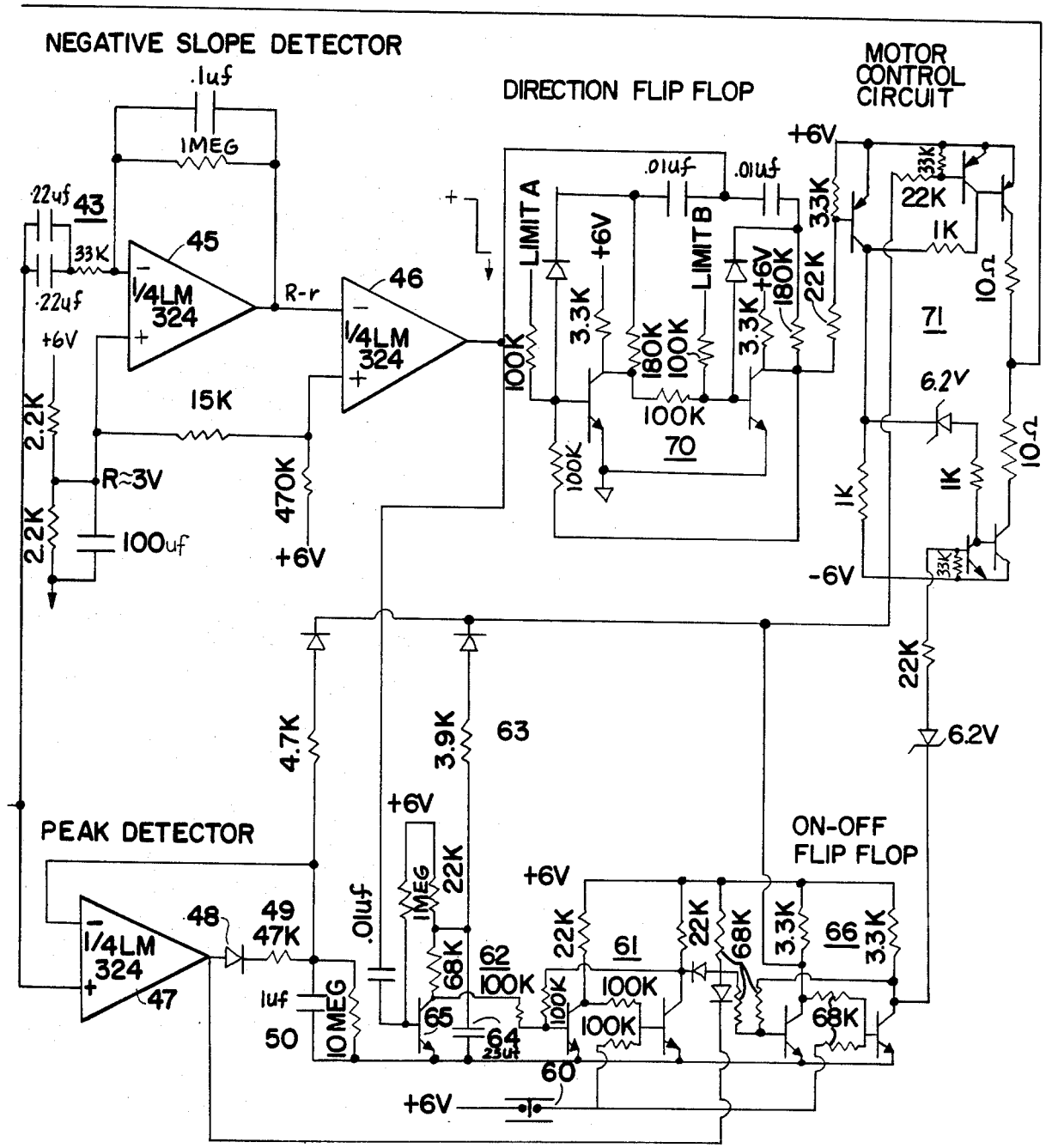

Referring to FIG. 3, there is shown a detailed schematic diagram and automatic focussing system according to this invention. The video signal from the television camera 30 is applied to the input of a common collector amplifier 31. A diode 32 acts as a clamp for the signal with the signal applied to the base electrode of the NPN transistor via a capacitor 33. The collector electrode of amplifier 31 is directly coupled to the base electrode of PNP transistor 34. The collector electrode of the PNP transistor 34 is coupled to an RC filter consisting of capacitor 35, resistors 36 and 37. The collector signal is also filtered with a series inductor capacitor filter in the collector circuit of transistor 34.

In general the negative slope detection technique causes the motor and lens mechanism to reverse if it is going in the wrong direction for optimum focus as soon as a negative slope (of sufficient amplitude above system noise level) is detected and causes the lens to achieve optimum focus in minimum time if approached from a relatively distant point. If the autofocus process is initiated when the system is close to focus, the time to achieve focus is slightly longer than the starting pulse roughly in the order of a second. Therefore, a major objective of rapid focus is achieved.

Essentially, the amplifiers 31 and 34 operate as the amplifier and band pass filter 10 of FIG. 1. The transistors cause a fall off at high frequency. The output of the filter is coupled to the anode of a detector diode 38 having the cathode coupled to a storage capacitor 39. Essentially, the diode 38 and capacitor 39 and resistor in parallel with capacitor 39 operate as a video detector to produce a DC signal indicative of the value of the video signal. The capacitor 39 is selected to provide an average value indicative of abrupt changes in each television line.

This is a further function as explained above of the band pass characteristics of the band pass filter. The output of the detector is applied to the non-inverting terminal of an operational amplifier 40. The operational amplifier 40 employs a selective feedback network 41 to further tailor the characteristics of the video detector signal before applying the same to the negative slope detector and peak detector.

Essentially as shown, the feedback employed in FIG. 3 in amplifier 40 constitutes a low pass filtering circuit which further responds primarily to the processed and detected high frequency components in the video signal detector output. Located above, there is shown an alternate circuit 42 which can be substituted as depicted in the FIGURE for circuit 41. The circuit 42 will provide low pass filtering and compression of the video detector signal to increase the range of the signal over which the system will operate. The output of the operational amplifier is coupled via capacitor 43 to the inverting input of another amplifier 45.

Amplifier 45 is arranged as a negative slope detector and has its output coupled to the inverting input of amplifier 46 also forming part of the negative slope detector. The circuit depicted above is well known and many examples of negative slope detectors are known in the art. Although an analog rate and peak detector are employed, an analog to digital convertor may alternately be used to convert the output of the video detector at the positive input to amplifier 40. At incremental time intervals successive differences may be performed digitally using a microprocessor to determine the slope for both negative slope and peak detection. The output of amplifier 40 is also coupled to the non-inverting terminal of an operational amplifier 47. Amplifier 47 has its output coupled to the anode of a diode 48 which in conjunction with resistor 49 and 51 and capacitor 50 functions as a peak detector.

Depicted in FIG. 3 is a momentary switch 60 which operates when depressed to start the automatic focus mode. The operation of switch 60 resets a first flip flop 61 and a second flip flop 66. The setting of flip flop 61 commences a timing cycle and permits cpacitor 64 to charge via resistor 63 which allows transistor 65 to go positive when its base goes negative. The charging time is selected to initially inhibit the negative slope detector output from setting flip flop 61 for the equivalent of the initial interval produced by the starting pulse described above relating to FIG. 1.

As indicated above, the triggering of flip flop 61 activates the input gate of flip flop 66 which gates the peak detector output. The flip flop 66 is effectively inhibited during the initial timing interval and until flip flop 61 changes state. The output of the operational amplifier 46 is directed to the toggle input of a Toggle flip flop 70 which is the direction flip flop 14 of FIG. 1.

The output of flip flop 70 is applied to the input of a motor control circuit 71 which operates to drive the DC motor 72 either clockwise or counter-clockwise dependent upon the direction detector and according to the description given in FIG. 1.

In the circuit diagram shown in FIG. 3, all components are indicated on the schematic with the values of the resistors and capacitors being given directly. All diodes employed are 1N914 except as indicated on the schematic. The NPN transistors are 2 N3904 with the PNP transistors being 2N2907. The operational amplifiers are LM324. All the above components are readily commercially available components and many substitutes and alternative components exist. Essentially, the circuit of FIG. 3 is constructed to implement the operation described in conjunction with FIG. 1

As previously indicated and shown in FIG. 3, the output of motor 72 may be coupled via a switch gear train to control the focussing of microscope 90. In this manner the light output of the microscope would be the input to the television camera and hence focussing of the microscope can be afforded by detecting the video signal as described above.

It is apparent that there are many modifications which will be discerned by one skilled in the art in reading the above noted specification. The basic system described can operate both with a black and white camera as well as a color camera. In operating with a color signal, color variations may effect the magnitude of certain circuit components but the approach in detecting abrupt changes in the luminance value allows one to automatically focus the color camera as well.

I claim:

1. An automatic focussing system responsive to a video signal of the type generated by a television camera to provide a focus adjustment for a focus assembly associated with a focusable apparatus comprising;
   filter means responsive to said video signal for providing at an output a band-limited signal,
   video detector means responsive to said band-limited signal to provide at an output a detected signal,
   detecting means responsive to said detected signal, said detecting means including a peak detector having an input coupled to said video detector means and responsive to said detected signal to provide a first output when said detected signal has a maxiumum peak value and including slope detecting means having an input coupled to said video detector means and responsive to said dectected signal to provide a second output only when the rate of change of said video signal is in a given direction, and
   logic means coupled to said detecting means and responsive to said first and second outputs to provide control signals indicative of the direction of focus adjustment,
   and drive means responsive to said control signals to provide a drive signal capable of adjusting a focus assembly to an optimum focus.

2. The automatic focusing system according to claim 1, wherein
   said filter means is a band pass filter capable of propagating mainly the high frequency components of said video signal.

3. The automatic focusing system according to claim 1, wherein
   said logic means includes a first flip-flop having a triggerable input coupled to the output of said slope detecting means and responsive to said indication to alter states indicative of the direction of said rate of change of said video signal.

4. The automatic focusing system according to claim 3 further including a second flip-flop having an input coupled to the output of said peak detector and operative to change state when said detected signal has a maximum peak value.

5. The automatic focusing system according to claim 1, wherein
   said drive means includes a motor capable of being driven in a clockwise or counter-clockwise direction.

6. The automatic focusing system according to claim 3 wherein
   said first flip-flop is a toggle flip-flop having the toggle input coupled to the output of said slope detecting means.

7. The automatic focusing system according to claim 1, further including start operating means coupled to said slope detecting means and operative to inhibit operation during an initial start period.

8. The automatic focusing system according to claim 1, wherein
   said focus assembly in an adjustable lens assembly associated with a television camera.

9. The automatic focusing system according to claim 1, wherein
   said focus assembly is an adjustable lens assembly associated with a microscope.

10. An automatic focusing system responsive to a video signal of the type generated by a television camera to provide a focus adjustment for a focus assembly associated with focusable apparatus comprising:
    a band pass filter responsive to said video signal to provide at an output a band limited signal containing mainly higher frequency components of said video signal,
    video detector means responsive to said band limited signal to provide at an output a detected signal indicative of the average value of said video signal over a determined period,
    a slope detector having an input coupled to said output of said video detector means and responsive to said detected signal to provide at an output a control signal when said detected signal exhibits a change of slope in a given direction, a peak detector having an input coupled to said output of said video detector means and responsive to said detected signal to provide at an output a stop signal when said detected signal exhibits a given magnitude indicative of a desired peak, a first triggerable flip-flop having a trigger input coupled to the output of said slope detector and operative to provide one state for a first direction of slope and a second state for a second direction, a second triggerable flip-flop having a trigger input coupled to the output of said peak detector and operative to change state upon detection of said desired peak, a motor control circuit having one input coupled to an output of said first flip-flop and a second input coupled to an output of said second flip-flop and operative to provide a first start signal operative to energize a motor in a first direction and a second start signal operative to energize a motor in a second direction and responsive to said change of state of said second flip-flop to stop said motor.

11. The automatic focusing system according to claim 10, further including:

start operating means coupled to said peak detector and said second flip-flop for providing a start pulse of a given duration during initiation of the automatic focusing mode for inhibiting said peak detector during said duration and for operating said second flip-flop in said other state to enable motor operation.

12. The automatic focusing system according to claim 10, wherein said slope detector is a negative slope detector for providing a control signal when said detected signal exhibits a slope in the negative direction.

13. The automatic focusing system according to claim 10, wherein said first flip-flop is a toggle flip-flop having the toggle input coupled to the output of said slope detector.

14. The automatic focusing system according to claim 10, wherein said band pass of said filter is between 200 KHz to 4 MHz.

15. The automatic focusing system according to claim 10, wherein said focusable apparatus is the focus assembly of a television camera.

16. The automatic focusing system according to claim 10, wherein said focusable apparatus is the focus assembly of a microscope.

* * * * *